US012675319B2

(12) United States Patent
Himajit et al.

(10) Patent No.: US 12,675,319 B2
(45) Date of Patent: Jul. 7, 2026

(54) SYSTEM FOR COLLABORATIVE EXECUTION OF A TASK AND A METHOD THEREOF

(71) Applicants: Robert Bosch GmbH, Stuttgart (DE); Robert Bosch Engineering and Business Solutions Private Limited, Bangalore (IN)

(72) Inventors: Aithal Himajit, Bangalore (IN); Bangalore Venkatakrishnaiah Mohan, Bangalore (IN)

(73) Assignees: Robert Bosch GmbH, Stuttgart (DE); Robert Bosch Engineering and Business Solutions Private Limited, Bangalore (IN)

( * ) Notice: Subject to any disclaimer, the term of this patent is extended or adjusted under 35 U.S.C. 154(b) by 854 days.

(21) Appl. No.: 18/059,587

(22) Filed: Nov. 29, 2022

(65) Prior Publication Data

US 2023/0168926 A1 Jun. 1, 2023

(30) Foreign Application Priority Data

Nov. 30, 2021 (IN) ........................... 2021 4105 5343

(51) Int. Cl.
*G06F 9/48* (2006.01)

(52) U.S. Cl.
CPC .................................. *G06F 9/4881* (2013.01)

(58) Field of Classification Search
CPC ..................................................... G06F 9/4881
See application file for complete search history.

(56) References Cited

U.S. PATENT DOCUMENTS

| | | | |
|---|---|---|---|
| 2020/0125957 A1 | 4/2020 | Lu et al. | |
| 2021/0188306 A1* | 6/2021 | Himayat | B60W 60/00 |
| 2022/0063622 A1* | 3/2022 | Jumpertz | G08G 1/22 |

* cited by examiner

*Primary Examiner* — Wissam Rashid
(74) *Attorney, Agent, or Firm* — Maginot, Moore & Beck LLP

(57) ABSTRACT

A system for collaborative execution of a task includes a plurality of edge units in communication with a principal processor. Each edge unit includes a collaborative intelligence module configured to establish a communication link amongst at least two of the edge units. The communication intelligence module is further configured to communicate task attributes of the task with at least one other edge unit, and to exchange sensor data from the set of sensors and a plan with the at least one other edge unit to create a joint workspace followed by execution of the task in collaboration with the at least one other edge unit.

4 Claims, 4 Drawing Sheets

SYSTEM FOR COLLABORATIVE EXECUTION OF A TASK AND A METHOD THEREOF

This application claims priority under 35 U.S.C. § 119 to patent application no. IN 2021 4105 5343, filed on Nov. 30, 2021 in India, the disclosure of which is incorporated herein by reference in its entirety.

The present disclosure relates to a system for collaborative execution of a task and a method thereof. More specifically the present disclosure relates to a decentralized collaborative intelligence between edge units.

BACKGROUND

Collaborative intelligence is defined as cooperation in a multi-agent distributed systems where each agent, human or machine, is autonomously contributing to a problem solving network. Traditional AI/ML algorithms like Supervised learning, Unsupervised learning, Reinforcement learning focus on building algorithms to better forecast and understand a given environment based on the defined inputs, and thus determine the best course of action. Conventional multi-agent algorithms adopt a framework of centralized training and decentralized execution. For example, the traditional AI/ML algorithms like Supervised learning, Unsupervised learning, Reinforcement learning focus on building algorithms to better forecast and understand a given environment based on the defined inputs, and thus determine the best course of action. However, these algorithms do not consider other decision making entities and consequences of their actions in the environment. Similarly placed concepts such as swarm intelligence might not have the same collective goal to achieve, but a few agents would come together dynamically in order to fulfil a task. Further in Federated Learning, ML model training is distributed across various devices, keeping private data secure, whereas collaborative intelligence is based on enabling two devices (either similar or dissimilar) to come together to execute a task.

United States patent application publication no. US2020/125957 titled "Multi-agent Cooperation Decision Making and Training method" provides a multi-agent cooperation decision-making and training method. In this method, information from agents are concatenated in order to train a deep reinforcement model using the steps: S1: encoding, by an encoder, local observations obtained by agents by using a multi-layer perceptron or a convolutional neural network as feature vectors in a receptive field; S2: calculating, by a graph convolution layer, relationship strength between the agents by using a relationship unit of a multi-headed attention mechanism, integrating, by a relationship convolution kernel of the relationship unit, the feature vectors in the receptive field into new feature vectors, and iterating the graph convolution layer for multiple times to obtain a relationship description of the multi-headed attention mechanism in a larger receptive field and at a higher order; S3: splicing the feature vectors in the receptive field and the new feature vectors integrated by the graph convolution layer, sending the spliced vectors to a value network, wherein the value network selects and performs an action decision with the highest future feedback expectation; and S4: storing a local observation set and related sets of the agents in a buffer region, collecting samples in the buffer region for training, and optimizing and rewriting a loss function.

BRIEF DESCRIPTION OF THE DRAWINGS

An embodiment of the disclosure is described with reference to the following accompanying drawings.

DETAILED DESCRIPTION

Figure 1:
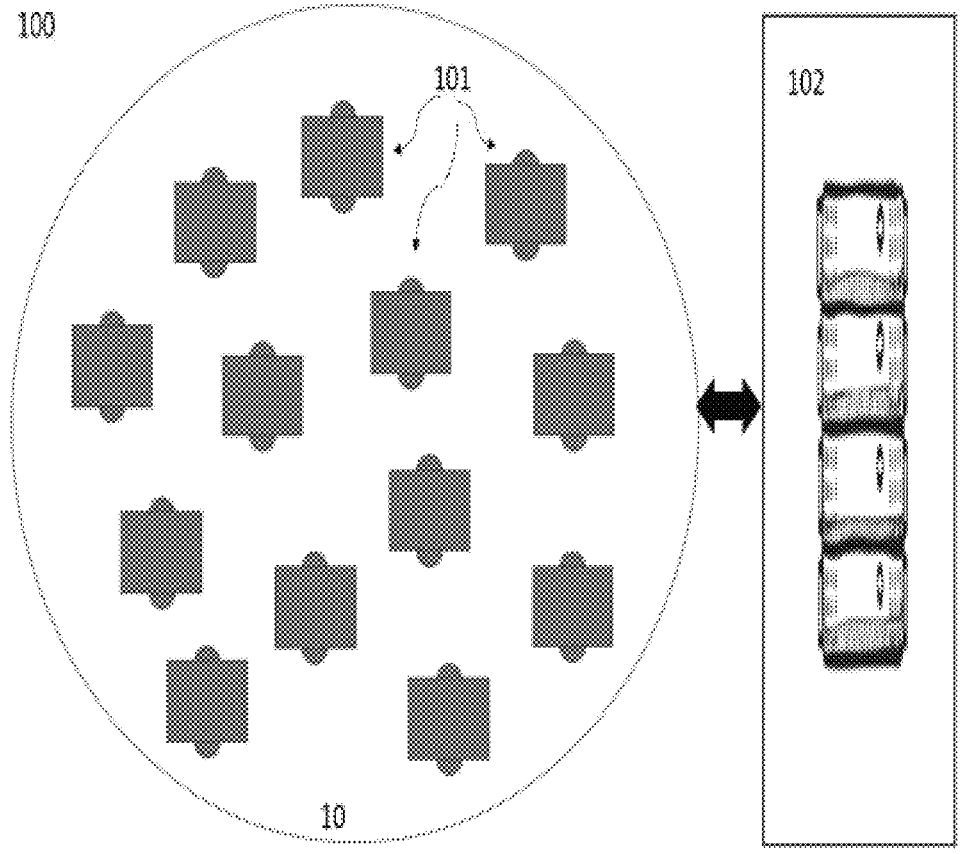
FIG. 1 depicts a system (100) for collaborative execution of a task.

FIG. 1 depicts a system (100) for collaborative execution of a task. The system (100) comprises a plurality of edge units (EDU (101)) and at least a principal processor (102), each EDU (101) in communication with the principal processor (102). The principal processor (102) is a centralized server that is embodied in a physical hardware processor or resides in a cloud. The processor can either be a logic circuitry or a software programs that respond to and processes logical instructions to get a meaningful result. A hardware processor within the EDU or the central processor (102) may be implemented in the system (100) as one or more microprocessors, microcomputers, microcontrollers, digital signal processors, central processing units, state machines, logic circuitries, and/or any component that operates on signals based on operational instructions.

The most important non-limiting feature of the present disclosure is the composition of the EDU (101). EDU (101) is the context of this disclosure can be electronic control units (ECUs) of any product ranging from a smartphone to an automobile or digital entities like robots. Each EDU (101) comprises one or more actuators and at least a set of sensors. The present disclosure is explained with the help of an exemplary embodiment of the disclosure, wherein the central processor can be a central computer in a warehouse and EDUs (101) are robots on the shopfloor of the warehouse. In this exemplary embodiment the set of sensors comprise vision sensor, sound Sensor, proximity sensor, tactile sensors, temperature sensor, navigation and positioning sensors and the like. Similarly, the actuators comprise the one or more movable arms and limbs of the robot using wheeled navigation.

In another embodiment wherein the EDUs refer to the ECUs of vehicles, the set of sensors and actuators could refer to the vehicle mounted sensors and ECU controlled actuators. It should be understood at the outset that, although exemplary embodiments are illustrated in the figures and described below, the present disclosure should in no way be limited to the exemplary implementations and techniques illustrated in the drawings and described below.

The system (100) is characterized by the functionality that each EDU (101) comprises a collaborative intelligence (CoIN~coin) module. The CoIN modules can either be a software embedded in a single chip or a combination of software and hardware where each module and its functionality is executed by separate independent chips connected to each other to function as the system (100). Embodiments of this module may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). Terms like "logic", "module", "component", "engine", "circuitry", "element", and "mechanism" may include, by way of example, software, hardware, firmware, and/or a combination thereof. For example, a neural network (101) mentioned herein after can be a software residing in the system (100) or the cloud or embodied within an electronic chip. Such neural network (101) chips are specialized silicon chips, which incorporate AI technology and are used for machine learning.

The collaborative intelligence module is configured to establish a communication link amongst at least two said EDUs (101). The coIN module is further configured to receive the task from the principal processor (102). The principal processor (102) can either broadcast the task to all EDUs (101) or to a selected few EDUs (101). The coIN module is then further configured to communicate task attributes with at least one other EDU (101). Task attributes refer to the characteristics of the task such as with reference to the exemplary embodiment, assume the task is lifting and transporting a package. Then the task attributes correspond to weight of the package, distance or position coordinates and destination coordinates and the like. The coin modules receive a response from at least one other EDU (101). The response is the willingness to do the task collaboratively or not. This is followed by the exchange of sensor data from the set of sensors and at least a plan with the at least one other EDU (101) in dependence of the response received. The plan refers to the individualistic plan of action initiated by each of the EDU (101) for the said task. The collaborative intelligence module further comprises at least a memory. The memory stores a joint workspace comprising the sensor data and the plan exchanged, the joint workspace is dynamically updated and stored in the memory. The joint workspace will be synchronized between the collaborating EDUs via the communication link established.

Figure 2:
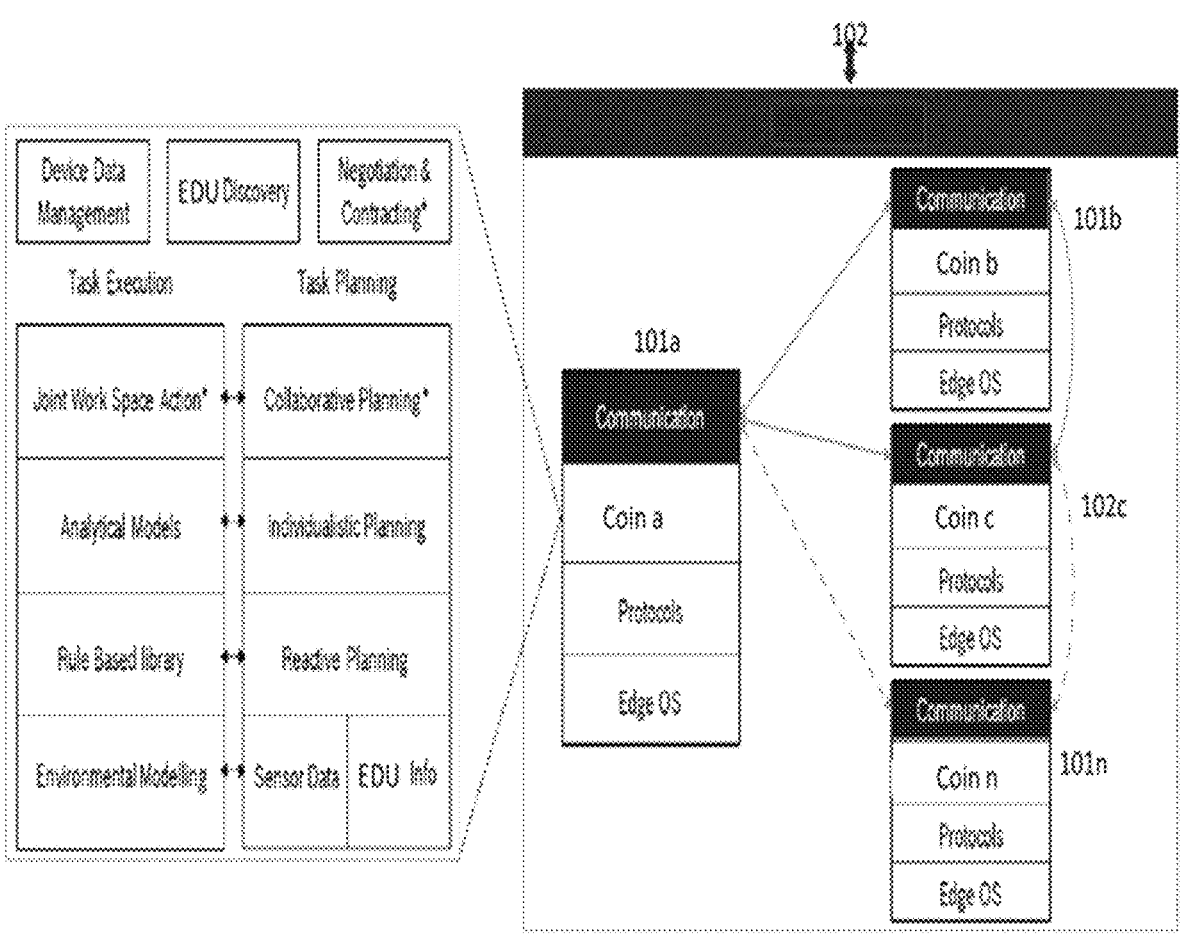
FIG. 2 is a flow-chart that illustrates method steps (200) for collaborative execution of a task in the system (100)

FIG. 2 is a block diagram of the EDU (101) and system (100) formed by the network of the EDUs (101). Collaborative Intelligence (CoIN modules) deployed on edge which are interconnected in a peer-to-peer fashion to enable information flow among them. The EDUs (101) are also connected to a centralized compute ecosystem (100) in order to carry out resource heavy computation. Each CoIN module would consist of functional blocks like Data Management, EDU (101) Discovery, Negotiation and Contracting, and Task Planning and Execution.

The CoIN module executes the task in collaboration with the at least one other EDU (101). While collaborating, decision making in the EDU (101) information received jointly from the sensors present in each of the participating EDUs. Hence, the execution of tasks comprises activating at least one actuator in the said two EDUs (101). The person skilled in the art will understand that in addition to the mentioned components and functionalities, the EDUs (101) can have other components and functionalities. Hence the EDUs (101) may or may not be homogenous.

Figure 3:
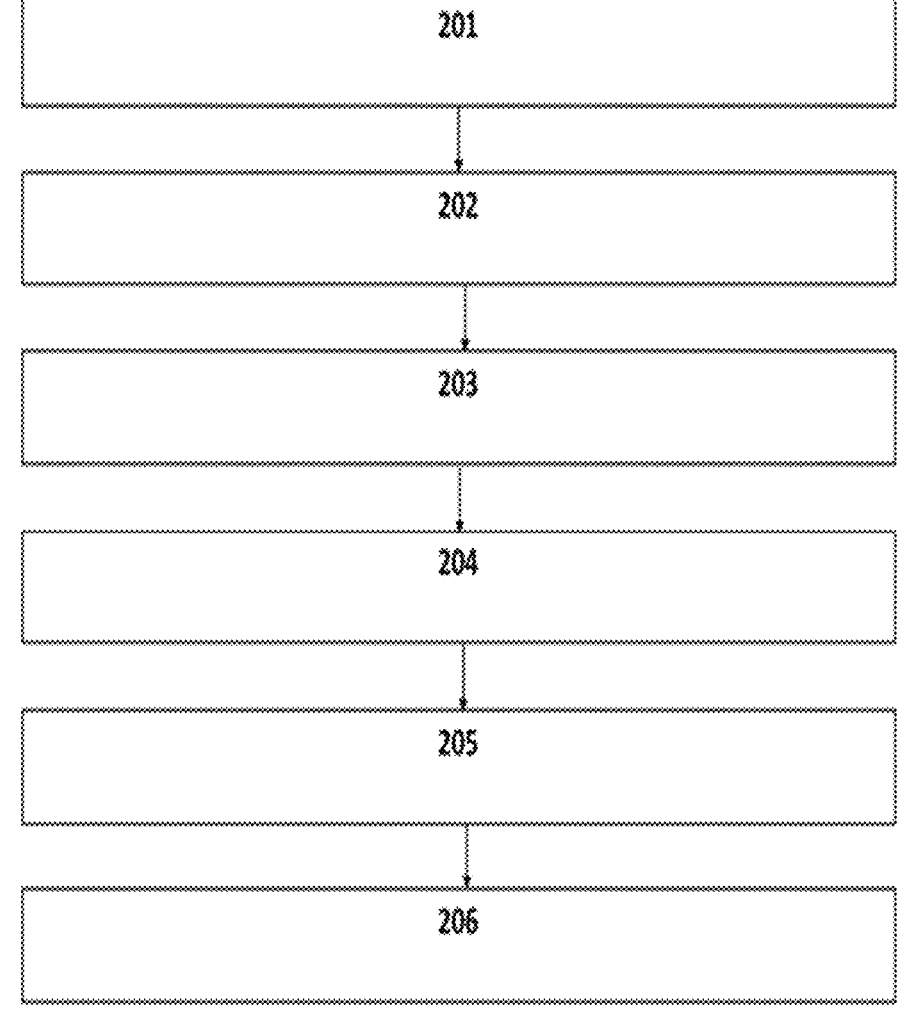
FIG. 3 is a block diagram of the edge units (EDU) (101) and system (100) formed by the network of the EDUs (101)

FIG. 3 is a flow-chart that illustrates method steps for collaborative execution of a task in the system (100). The system (100) framework and architecture has been elaborated in accordance with FIG. 1. Method step 201 comprises establishing a communication link amongst at least two said EDUs (101) by means of the collaborative intelligence module. This can be enabled by known communication protocols like HTTP (Hypertext Transfer Protocol), MQTT (Message Queuing Telemetry Transport) but not limited to these. Method step 202 comprises receiving the task from the principal processor (102). The task can either broadcast to all EDUs (101) or communicated a selected few EDUs (101) based on the task requirements through known one or more communication protocols known to a person skilled in the art.

Method step 203 comprises communicating the task attributes with at least one other EDU (101) using the communication link. Message sharing between the EDUs (101) will be in Peer-to-Peer fashion with all agents employing a common protocol like (but not limited to) FIPA. The messages will be constructed/deconstructed based on accepted standards like (but not limited to) ACL (Agent Communication Language). The contents of the messages will adhere to standardized message structure protocols such as Contract Net Protocol. Task attributes refer to the characteristics of the task such as with reference to the exemplary embodiment, assume the task is lifting and transporting a package. Then the task attributes correspond to weight of the package, distance or position coordinates and destination coordinates and the like.

Method step 204 comprises receiving a response from at least one other EDU (101) using the communication link. The response is the willingness to do the task collaboratively or not. This can be dependent on the limitations of the EDUs (101) such as in accordance with the exemplary embodiment the lifting power, fuel or charge left, status of the EDU (101) i.e. engaged or free and the like.

Method step 205 comprises exchanging sensor data from the set of sensors and at least a plan with the at least one other EDU (101) in dependence of the response received using the communication link. Exchanging sensor data from the set of sensors and at least a plan with the at least one other EDU (101) creates a joint workspace. This joint workspace is dynamically updated and stored in a memory of the CoIN module. For example, in accordance with exemplary embodiment, the joint workspace may have an action map which basically coordinates the information about each EDUs (101) actions and services amongst all agents in a peer network, to enable joint task planning and execution. Plans are shared and executed based on the current state of each EDU and the joint workspace. Change to a state of the EDU (101), not in accordance with the plan is immediately notified and corrected by all participating EDUs.

Method step 206 comprises executing the task in collaboration with the at least one other EDU (101). A person skilled in the art will appreciate that while these method steps describes only a series of steps to accomplish the objectives, these methodologies may be implemented with required modifications suitable to the requirements.

Figure 4:
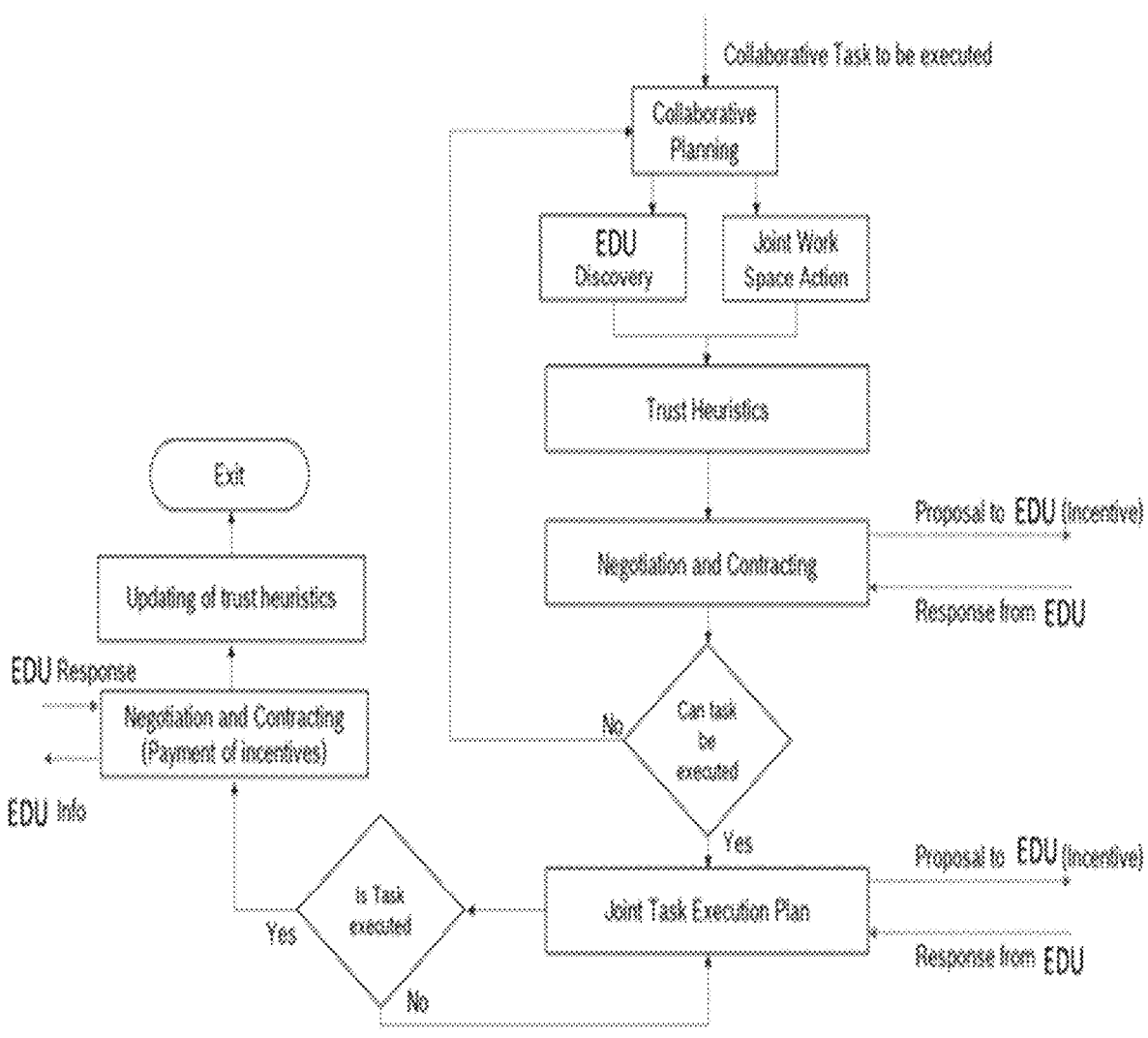
FIG. 4 is process flow chart depicting the execution of methods step (200).

FIG. 4 is process flow chart depicting the execution of methods step (200). Once an EDU (101) receives a task, it will go through its existing task execution library to see whether the task can be executed by itself. If it finds no implementation, it will check the collaborative planning block to check whether the task can be executed by assistance from other EDUs (101). The Collaborative Planning Block looks into Joint Workspace action map and the EDU (101) discovery block to find other EDUs (101) capable of executing the task either alone or in collaboration. Selection of the other EDU (101) happens based on a trust heuristic function. Each EDU (101) would be aided by a trust heuristic function which describes which among the peer EDUs (101) are capable of collaborating with. This heuristic would be based on the past actions of an EDU (101) in a given network. This could be as simple as a completed action frequency counter, or an analytical model based on AI based algorithm.

Further, trust heuristic could either be a centralized oracle, or a decentralized information sharing mechanism. Based on the trust heuristic required number of EDUs (101) are chosen and a proposal for collaboration is shared among them as defined in the communication protocol. Furthermore, the proposal can be combined with an incentive model as defined by Negotiation and Contracting block. The peers would have an option to either accept or reject the request based on the incentive provided. Once a specific threshold among the collaborating peers are reached, the Collaborative Planning block would run an optimization routine on Joint Workspace, where the services and status of each agents in the peer network are maintained.

This idea to develop the system (100) for collaborative execution of a task and the method thereof defines a framework for devices to share and understand information and thus provides a way for two or more devices to execute a task together without the need to explicitly code the same. The information will be shared among the devices in order to plan and execute optimum solutions together rather than individually or centrally. This would in turn help the devices to be capable of decision making in a dynamically changing environment and in the presence of various other collaborating/competing devices.

It must be understood that the embodiments explained in the above detailed description are only illustrative and do not limit the scope of this disclosure. Any modification to the system (100) for collaborative execution of a task and the method thereof are envisaged and form a part of this disclosure. The scope of this disclosure is limited only by the claims.

What is claimed is:

1. A system for collaborative execution of a task, comprising:

a principal processor; and a plurality of edge units, each edge unit in communication with the principal processor, and each edge unit comprising (i) one or more actuators, (ii) a set of sensors, and (iii) a collaborative intelligence module having a memory, wherein the collaborative intelligence module is configured to establish a communication link amongst at least two edge units of the plurality of edge units, wherein the collaborative intelligence module is further configured to:

receive the task from the principal processor;

communicate task attributes with at least one other edge unit of the plurality of edge units;

receive a response from the at least one other edge unit;

exchange sensor data from the set of sensors and a plan with the at least one other edge unit based on the response received; and execute the task in collaboration with the at least one other edge unit, wherein the memory stores a joint workspace comprising the sensor data and the plan, and wherein the joint workspace is dynamically updated and stored in the memory.

2. The system for collaborative execution of a task as claimed in claim 1, wherein execution of task comprises activating at least one of the one or more actuators of the at least two edge units.

3. A method for collaborative execution of a task in a system comprising a plurality of edge units and a principal processor, wherein each edge unit is in communication with the principal processor, and each edge unit comprises (i) a set of sensors, (ii) one or more actuators, and (iii) a collaborative intelligence module having a memory, the method comprising:

establishing a communication link amongst at least two edge units of the plurality of edge units using the collaborative intelligence module;

receiving the task from the principal processor;

communicating task attributes of the task with at least one other edge unit of the plurality of edge units using the communication link;

receiving a response from the at least one other edge unit using the communication link;

exchanging sensor data from the set of sensors and a plan with the at least one other edge unit based on the response received using the communication link; and executing the task in collaboration with the at least one other edge unit, wherein exchanging the sensor data and the plan with the at least one other edge unit creates a joint workspace, and wherein the joint workspace is dynamically updated and stored in the memory of the collaborative intelligence module.

4. The method for collaborative execution of a task as claimed in claim 3, wherein execution of the task comprises activating at least one of the one or more actuators of the at least two edge units.

* * * * *